United States Patent
Yip et al.

(10) Patent No.: US 10,791,316 B2
(45) Date of Patent: Sep. 29, 2020

(54) METHOD FOR TRANSMITTING DATA ABOUT THREE-DIMENSIONAL IMAGE

(71) Applicant: Samsung Electronics Co., Ltd., Suwon-si, Gyeonggi-do (KR)

(72) Inventors: Eric Yip, Seoul (KR); Ji-Hwan Woo, Seoul (KR); Byeong-Doo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/498,067

(22) PCT Filed: Jan. 30, 2018

(86) PCT No.: PCT/KR2018/001286
§ 371 (c)(1),
(2) Date: Sep. 26, 2019

(87) PCT Pub. No.: WO2018/182161
PCT Pub. Date: Oct. 4, 2018

(65) Prior Publication Data
US 2020/0107007 A1 Apr. 2, 2020

Related U.S. Application Data

(60) Provisional application No. 62/481,274, filed on Apr. 4, 2017, provisional application No. 62/529,867, filed on Jul. 7, 2017.

(30) Foreign Application Priority Data

Mar. 28, 2017 (KR) ........................ 10-2017-0039641
Dec. 19, 2017 (KR) ........................ 10-2017-0175049

(51) Int. Cl.
*H04N 7/00* (2011.01)
*H04N 13/178* (2018.01)
(Continued)

(52) U.S. Cl.
CPC ......... *H04N 13/178* (2018.05); *H04N 13/194* (2018.05); *H04L 67/42* (2013.01)

(58) Field of Classification Search
CPC ..... G06T 11/60; G06T 5/001; H04N 5/23238; H04N 7/183; H04N 13/178; H04N 13/194; G06K 9/00221; H04L 67/42
(Continued)

(56) References Cited

U.S. PATENT DOCUMENTS

2007/0022215 A1 1/2007 Singer et al.
2011/0116772 A1 5/2011 Kwon et al.
(Continued)

FOREIGN PATENT DOCUMENTS

JP 2016-105593 A 6/2016
KR 10-2011-0097596 A 8/2011
(Continued)

OTHER PUBLICATIONS

Miska M Hannuksela et al: Virtual reality video metadata in ISO base media file format, 116. MPEG Meeting; Oct. 17, 2016-Oct. 21, 2016; Chengdu; (Motion Picture Expert Group or ISO/I EC JTC1/SC29/WG11) No. m38945, Oct. 12, 2016 (Oct. 12, 2016), XP030067293.
(Continued)

*Primary Examiner* — Robert Chevalier
(74) *Attorney, Agent, or Firm* — Jefferson IP Law, LLP

(57) ABSTRACT

Provided is a method for transmitting data about an omnidirectional image by a server. The method comprises the steps of: receiving, from a terminal, information about a viewport of the terminal; selecting, on the basis of information about the viewport and the respective qualities of a plurality of tracks associated with the omnidirectional
(Continued)

image, at least one track among the plurality of tracks; and transmitting data about the selected at least one track to the terminal.

20 Claims, 9 Drawing Sheets

(51) Int. Cl.
  *H04N 13/194*  (2018.01)
  *H04N 13/00*  (2018.01)
  *H04L 29/06*  (2006.01)
(58) Field of Classification Search
  USPC .................................. 348/36, 42, 46, 47, 51
  See application file for complete search history.

(56) References Cited

U.S. PATENT DOCUMENTS

| | | | |
|---|---|---|---|
| 2013/0135315 A1* | 5/2013 | Bares .................. | G11B 27/031 345/473 |
| 2014/0341280 A1 | 11/2014 | Yang et al. | |
| 2015/0071547 A1* | 3/2015 | Keating ............... | G06K 9/6267 382/195 |
| 2016/0150212 A1 | 5/2016 | Moura et al. | |
| 2018/0061002 A1* | 3/2018 | Lee ........................ | H04N 19/85 |
| 2018/0091577 A1 | 3/2018 | Park et al. | |
| 2019/0052858 A1 | 2/2019 | Yip et al. | |

FOREIGN PATENT DOCUMENTS

| | | | |
|---|---|---|---|
| KR | 10-2012-0080646 A | 7/2012 |
| KR | 10-2016-0125708 A | 11/2016 |
| KR | 10-2017-0096975 A | 8/2017 |
| WO | 2017/138801 A1 | 8/2017 |

OTHER PUBLICATIONS

"Text of ISO/I EC CD 23000-20 Omnidirectional Media Application Format", 117. MPEG Meeting;Jan. 16, 2017-Jan. 20, 2017; Geneva; (Motion Picture Expert Group or ISO/IEC JTC1/SC29/WG11) No. N16636, Jan. 30, 2017 (Jan. 30, 2017), XP030023307.
Hannuksela (Nokia) M M: Quality ranking indication, 117. MPEG Meeting; Jan. 16, 2017-Jan. 20, 2017; Geneva; (Motion Picture Expert Group or ISO/IEC JTC1/SC29/WG11) No. m39901, Jan. 18, 2017 (Jan. 18, 2017), XP030068246.
Hyun Mook Oh et al: Region-wise quality indication SEI message, 27. JCT-VC Meeting; Mar. 31, 2017-Apr. 7, 2017; Hobart; (Joint Collaborative Team on Video Coding of ISO/IEC JTC1/SC29/WG11 and ITU-TSG.16 ); URL:http://wftp3.itu.int/av-arch/jctvc-site/ No. JCTVC-AA0030, Mar. 22, 2017 (Mar. 22, 2017), XP030118197.
Extended European Search Report dated Nov. 26, 2019, issued in European Application No. 18776566.4.

* cited by examiner

METHOD FOR TRANSMITTING DATA ABOUT THREE-DIMENSIONAL IMAGE

CROSS-REFERENCE TO RELATED APPLICATION(S)

This application is a U.S. National Stage application under 35 U.S.C. § 371 of an International application number PCT/KR2018/001286, filed on Jan. 30, 2018, which is based on and claimed priority of a Korean patent application number 10-2017-0039641, filed on Mar. 28, 2017 and Korean patent application number 10-2017-0175049, filed on Dec. 19, 2017, in the Korean Intellectual Property Office, and U.S. Provisional application Ser. No. 62/481,274, filed on Apr. 4, 2017 and U.S. Provisional application Ser. No. 62/529,867, filed on Jul. 7, 2017, the disclosure of which is incorporated by reference herein in its entirety.

TECHNICAL FIELD

The disclosure relates to a method and a device for transmitting data of a three-dimensional (3D) image.

BACKGROUND ART

With the development of Virtual Reality (VR) and Augmented Reality (AR) technology, techniques for processing and transmission of 3D images (or omnidirectional images) for display on a device capable of providing VR or AR are also being improved.

To provide omnidirectional images to users wearing a VR device, data of a 3D image including data of the omnidirectional image may have a very large size. Thus, transmitting data of a 3D image may increase the load of a transmission system due to the data size. In particular, the size of data of a 3D image may be a significant limitation in providing a 3D image in real time.

DETAILED DESCRIPTION OF THE INVENTION

Technical Problem

In order to reduce data traffic related to a 3D image, a server may generate a plurality of tracks including different pieces of 3D image information and may transmit only data of at least one track selected from among the plurality of tracks to a terminal (e.g., a VR device). In this case, there is a need for a method for constructing a plurality of tracks and a method for selecting at least one track to transmit from among a plurality of tracks in order to improve efficiency in transmitting and processing data of the 3D image.

Further, in order to reduce data traffic related to a 3D image, data of all regions of the 3D image may be configured to have different qualities rather than to have a uniform quality. Thus, there is a need for an efficient method for configuring and utilizing quality information from data of a 3D image.

Accordingly, an aspect of the disclosure is to provide a method and a device for constructing a plurality of tracks associated with a 3D image and selecting at least one track to be transmitted from among the plurality of tracks.

Another aspect of the disclosure is to provide a method and a device for configuring and utilizing quality information from data of a 3D image.

The aspects of the disclosure are not limited to the technical aspects mentioned above, and other aspects not mentioned will be clearly understood by those skilled in the art from the following description.

Technical Solution

According to an embodiment of the disclosure, a method for transmitting, by a server, data of an omnidirectional image includes: receiving information on a viewport of a terminal from the terminal; selecting at least one track among a plurality of tracks associated with the omnidirectional image based on the information on the viewport and a quality of each of the plurality of tracks; and transmitting data of the selected at least one track to the terminal.

According to another embodiment of the disclosure, a server for transmitting data of an omnidirectional image includes: a communication interface; and a processor configured to be connected to the communication interface, wherein the processor is configured to: receive information on a viewport of a terminal from the terminal; select at least one track among a plurality of tracks associated with the omnidirectional image based on the information on the viewport and a quality of each of the plurality of tracks; and transmit data of the selected at least one track to the terminal.

Details of other embodiments are included in the detailed description and the drawings.

Advantageous Effects

Embodiments of the disclosure have at least the following effects.

It is possible to provide a method and a device for constructing a plurality of tracks associated with a 3D image and selecting at least one track to transmit from among the plurality of tracks.

It is also possible to provide a method and a device for configuring and utilizing quality information from data of a 3D image.

The effects of the disclosure are not limited by the content provided above, and various other effects are included in the specification.

MODE FOR CARRYING OUT THE INVENTION

The advantages and features of the disclosure and methods of achieving the same will be apparent by referring to embodiments of the disclosure as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims.

It will be understood that, although the terms "first", "second", and the like may be used herein to describe various elements or components, these elements or components should not be limited by these terms. These terms are only used to distinguish one element or component from another element or component. Thus, a first element or component discussed below could be termed a second element or component without departing from the scope of the disclosure.

Figure 1:
FIG. 1 illustrates a system of a transmitter for transmitting data of a 3D image according to an embodiment of the disclosure.

FIG. 1 illustrates a system of a transmitter for transmitting data of a 3D image according to an embodiment of the disclosure.

FIG. 1 shows the system of the transmitter according to the embodiment of the disclosure. The transmitter may be a server that provides data or a service associated with a 3D image. Here, the 3D image may refer to both a dynamic image and a static image. The transmitter may generate or receive a 3D image (110). The transmitter may generate a 3D image by stitching images captured by a plurality of cameras in different directions. The transmitter may receive data of an already produced 3D image from the outside. A 3D image may be rendered in any shape of a sphere, a cube, a cylinder, or an octahedron. However, the illustrated shapes of the 3D image are provided for illustrative purposes, and various shapes of 3D images available in this technical field may be generated or received.

The transmitter may project a 3D image into a 2D image (120). To project a 3D image into a 2D image, any one of equirectangular projection (ERP), octahedron projection (OHP), cylindrical projection, cubic projection, and various projection methods available in this technical field may be used.

The transmitter may pack the projected 2D image (130). Packing may indicate generating a new 2D image (i.e., a packed 2D image) by modifying and/or rearranging at least some of a plurality of regions included in the projected 2D image. Here, modifying a region may indicate resizing, transforming, rotating and/or re-sampling (e.g., upsampling, downsampling, or differential sampling according to a position in the region) the region. These packing methods may be referred to as region-wise packing.

Figure 2:
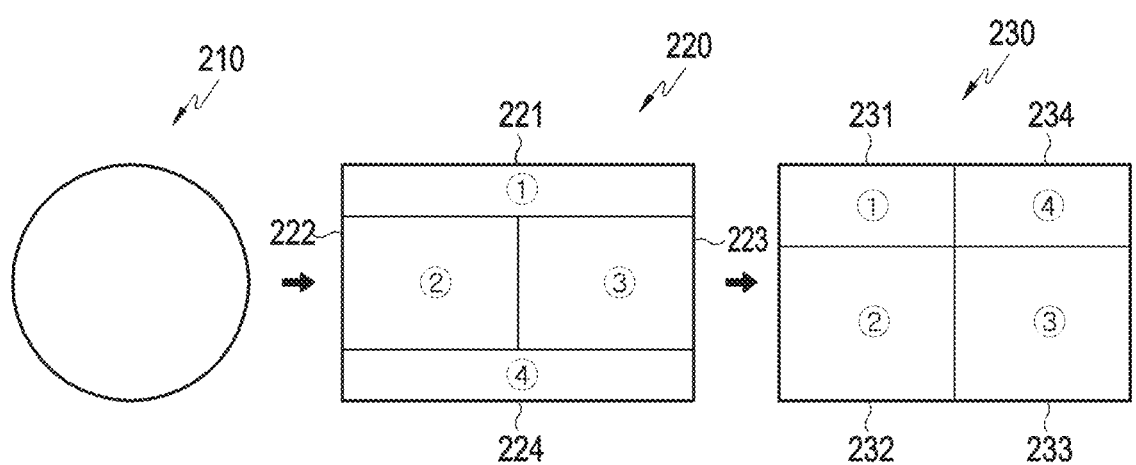
FIG. 2 illustrates an example of projecting a 3D image into a 2D image and packing the projected 2D image according to an embodiment of the disclosure.

Hereinafter, projection 120 and packing 130 will be described in detail with reference to FIG. 2. FIG. 2 illustrates an example of projecting a 3D image into a 2D image and packing the projected 2D image according to an embodiment of the disclosure. In FIG. 2, an illustrative 3D image 210 may have a spherical shape. The 3D image 210 may be projected by an illustrative ERP method, thereby generating a projected 2D image 220. The projected 2D image 220 may be divided into a plurality of regions 221, 222, 223, and 224. A method for dividing the projected 2D image 220 may vary depending on embodiments.

A packed 2D image 230 may be generated from the projected 2D image 220. The packed 2D image 230 may be generated by modifying or rearranging the plurality of regions 221, 222, 223, and 224 of the projected 2D image 220. A plurality of regions 231, 232, 233, and 234 of the packed 2D image 230 may sequentially correspond to the plurality of regions 221, 222, 223, and 224 of the projected 2D image 220, respectively. The modification and rearrangement of the plurality of regions 231, 232, 233, and 234 of the packed 2D image 230 illustrated in FIG. 2 are provided for illustrative purposes, and various modifications and rearrangements may be employed depending on embodiments.

To indicate a tile region (i.e., the plurality of regions of the projected 2D image), TileRegionGroupEntry may be used. The syntax of TileRegionGroupEntry is illustrated in Table 1.

TABLE 1

```
class TileRegionGroupEntry( ) extends VisualSampleGroupEntry ('trif')
{
    unsigned int(16) groupID;
    unsigned int(1) tile_region_flag;
    if (!tile_region_flag)
        bit(7)  reserved = 0;
    else {
        unsigned int(2) independent_idc;
        unsigned int(1) full_picture;
        unsigned int(1) filtering_disabled;
        unsigned int(1) has_dependency_list;
        bit(2)  reserved = 0;
        if (!full_picture) {
            unsigned int(16) horizontal_offset;
            unsigned int(16) vertical_offset;
            bit(7) reserved = 0;
            unsigned int(1) omni.fov;
            if (omni_fov) {
                unsigned int(16) center_pitch;
                unsigned int(16) center_yaw;
                unsigned int(16) hor_range;
                unsigned int(16) ver_range;
            }
        }
        unsigned int(16) region_width;
        unsigned int(16) region_height;
        if (has_dependency_list) {
            unsigned int(16) dependency_tile_count;
            for (i=1; i<= dependency_tile_count; i++ )
                unsigned int(16) dependencyTileGroupID;
        }
}
```

The semantics of parameters of the above syntax are described as follows.

groupID—is a unique identifier of a tile region group described by this sample group entry. The value of groupID in a tile region group entry needs to be greater than 0. A value of 0 is reserved for special use. When SampleToGroupBox of type 'nalm' and grouping_type_parameter which is the same as that of 'trif' are present, SampleGroupDescriptionBox of type 'trif' is present, the following applies.

The value of groupID in the tile region group entry needs to be the same as groupID of one among entries of NALUMapEntry.

A network abstraction layer (NAL) unit mapped to groupID 0 by NALUMapEntry indicates that the NAL unit is required to decode any tile region in the same coded picture as the NAL unit.

(Although there may be a plurality of tile region group entries having the same horizontal_offset, vertical_offset, region_width, and region_height values, the plurality of tile region group entries may have different group ID values in order to describe various dependencies.)

tile_region_flag—tile_region_flag equal to 1 specifies that a region which is covered by NAL units in a picture and is associated with the tile region group entry is a tile region and additional information about the tile region is provided via a subsequent field in the tile region group entry. A value of 0 specifies that a region which is covered by NAL units in a picture and is associated with the tile region group entry is not a tile region and additional information about the region is not provided in the tile region group entry. When a multi-layer bitstream is returned in one or more tracks, the following restriction applies to two random layers of the bitstream, which are layerA and layerB. When tile_region_flag corresponding to an NAL unit of layerA is associated with gIdA which is groupID equal to 1 and tile_region_flag corresponding to an NAL unit of layerB is associated with gIdB which is groupID equal to 1, gIdA and gIdB need to be different.

independent_idc—specifies coding dependencies between each tile region associated with the tile region group entry and other tile regions within the same picture or reference pictures in the same layer. Inter-layer dependencies are indicated by a list of dependencyTileGroupID (when has_dependency_list is equal to 1). This field has the following values.

- When independent_idc is equal to 0, coding dependencies between this tile region and other tile regions having within the same picture or reference pictures in the same layer are described by either a list of dependencyTileGroupID (when has_dependency_list is equal to 1) or the unknown (when has_dependency_list is equal to 0).
- When independent_idc is equal to 1, there are no temporary dependencies between this tile region and tile regions having different group IDs within random reference pictures in the same layer, but there are coding dependencies between this tile region and tile regions having the same group ID within a reference picture in the same layer.
- When independent_idc is equal to 2, there are no coding dependencies between this tile region and a random tile region within a reference picture in the same layer.
- A value of 3 is reserved.

full_picture—When this field is set, this tile region group entry indicates a full picture. region_width and region_height need to be set as the width and the height of the full picture, respectively, and independent_idc needs to be set to 1 or 2.

filtering_disabled—When this field is set, an in-loop filtering operation does not require access to pixels adjacent to this tile region with respect to each tile region associated with this tile region group entry. That is, bit-exact reconstruction of the tile region is possible without decoding adjacent tiles.

has_dependency_list—When set to 1, this field indicates that dependency_tile_count and a list of dependencyTileGroupID are present if dependency_tile_count exceeds 0. When this field is set to 0, there is neither dependency_tile_count nor dependencyTileGroupID.

horizontal_offset and vertical_offset—respectively indicate horizontal and vertical offsets of a top left pixel of a rectangular region covered by tiles in each tile region associated with this tile region group entry in relation to a top left pixel of a default region in luma samples. Regarding high-efficiency video coding (HEVC) and L-HEVC tile tracks, a default region used within TileRegionGroupEntry is a picture to which tiles in the tile region associated with this tile region group entry belong.

omni_fov—When set, this field indicates each tile region associated with this tile region group entry corresponding to a particular field of view (FOV) of an omnidirectional video (on the surface of a sphere). In this case, as defined in an Omnidirectional Media Application Format (OMAF), center_pitch, center_yaw, hor_range, and ver_range are specified.

center_pitch[i] and center_yaw[i]—specify the center point of a spherical region represented by the ith region in 0.01 degrees on a coordinate system specified by a Projection Orientation Box (indicating the orientation of a 3D image). center_yaw ranges from −18000 to 17999, and center_pitch ranges from −9000 to 9000.

hor_range and ver_range—respectively indicate horizontal and vertical ranges of an ith region in 0.01 degrees. hor_range and ver_range specify a range to pass through the center point of the ith region. hor_range ranges from 1 to 36000, and ver_range ranges from 1 to 18000. center_pitch+ver_range/2 is not allowed to exceed 9000. center_pitch−ver_range/2 is not allowed to be less than −9000.

When a projection format in the OMAF is equirectangular projection, the spherical region represented by the ith rectangular region is a region specified by two yaw circles and two pitch circles.

region_width and region_height—respectively indicate the width and the height of a rectangular region covered by tiles in each tile region associated with this tile region group entry.

dependency_tile_count—indicates the number of tile regions on which each tile region associated with this tile region group entry depends.

dependencyTileGroupID—indicates a group ID of a tile region on which this tile group depends (as defined by TileRegionGroupEntry). Tile regions on which this tile group depends may be obtained from those in the same layer or reference layers.

RectRegionPacking(i) represented by the syntax in Table 2 specifies a method of packing a source rectangular region of a projected frame into a target rectangular region of a packed frame. Horizontal mirroring and 90-degree, 180-degree, or 270-degree rotation may be indicated, and vertical and horizontal re-sampling may be inferred from the width and height of regions.

TABLE 2

```
aligned(8) class RectRegionPacking(i) {
    unsigned int(32) proj_reg_width[i];
    unsigned int(32) proj_reg_height[i];
    unsigned int(32) proj_reg_top[i];
    unsigned int(32) proj_reg_left[i];
    bit(7) reserved = 0;
    unsigned int(1)  fov_flag[i];
    if(fov_flag == 1){
        unsigned int(16) center_pitch[i];
        unsigned int(16) center_yaw[i];
        unsigned int(16) hor_range[i];
        unsigned int(16) ver_range[i];
    }
    unsigned int(8)  transform_type[i];
    unsigned int(32) packed_reg_width[i];
    unsigned int(32) packed_reg_height[i];
    unsigned int(32) packed_reg_top[i];
    unsigned int(32) packed_reg_left[i];
    unsigned int (8) quality_ranking[i];
}
```

The semantics of parameters of the above syntax are described as follows.

proj_reg_width[i]—indicates the width of an ith region of a frame projected in pixels. proj_reg_width[i] is greater than 0.

proj_reg_height[i]—indicates the height of the ith region of the frame projected in pixels. proj_reg_height[i] is greater than 0.

proj_reg_top[i] and proj_reg_left[i]—respectively indicate an ith topmost sample row and an ith leftmost sample column of the projected 2D frame. These values range from 0, which indicates of the top left corner of the projected frame, to proj_frame_height and proj_frame_width, respectively.

proj_reg_width[i] and proj_reg_left[i] are restricted such that proj_reg_width[i]+proj_reg_left[i] is less than proj_frame_width.

proj_reg_height[i] and proj_reg_top[i] are restricted such that proj_reg_height[i]+proj_reg_top[i] is less than proj_frame_height.

When the projected frame is stereoscopic, proj_reg_width [i], proj_reg_height[i], proj_reg_top[i], and proj_reg_left[i] need to be set such that a region identified by these values in the projected frame is present within a single constituent frame of the projected frame.

fov_flag [i]–fov_flag [i] equal to 1 specifies that FOV-related parameters are indicated with respect to a region.

center_pitch[i] and center_yaw[i]—specify the center point of a spherical region represented by the ith region in 0.01 degrees on a coordinate system specified by a Projection Orientation Box (indicating the orientation of a 3D image). center_yaw ranges from −18000 to 17999, and center_pitch ranges from −9000 to 9000.

hor_range and ver_range—respectively indicate horizontal and vertical ranges of an ith region in 0.01 degrees. hor_range and ver_range specify a range to pass through the center point of the ith region. hor_range ranges from 1 to 36000, and ver_range ranges from 1 to 18000. center_pitch+ver_range/2 is not allowed to exceed 9000. center_pitch−ver_range/2 is not allowed to be less than −9000.

When a projection format is equirectangular projection, the spherical region represented by the ith rectangular region is specified by two yaw circles and two pitch circles.

transform_type[i]—specifies rotation or mirroring applied to the ith region of the projected frame to be mapped to the packed frame. When transform_type[i]specifies both rotation and mirroring, rotation is applied after mirroring. The following values may be used for transform_type[i], and other values are reserved.

0: No transformation
1: Horizontal mirroring
2: 180-degree rotation (counterclockwise)
3: Horizontal mirroring and then 180-degree rotation (counterclockwise)
4: Horizontal mirroring and then 900-degree rotation (counterclockwise)
5: 90-degree rotation (counterclockwise)
6: Horizontal mirroring and then 270-degree rotation (counterclockwise)
7: 270-degree rotation (counterclockwise)

packed_reg_width[i], packed_reg_height[i], packed_reg_top[i], and packed_reg_left[i]—respectively specify the width, height, topmost sample row, and leftmost sample column of the packed frame. A rectangle specified by packed_reg_width[i], packed_reg_height[i], packed_reg_top[i], and packed_reg_left[i] does not overlap a rectangle specified by packed_reg_width[j], packed_reg_height [j], packed_reg_top[j], and packed_reg_left[j]. j is an integer ranging from 0 to i−1.

quality_ranking[i]—specifies the quality ranking (i.e., quality level) of the region relative to that of other regions in 360 content (i.e., the entire projected frame). The quality ranking indicates priority in delivery and rendering. A lower value represents higher-quality content. quality_ranking[i] has a value ranging from 1 to 100. quality_ranking equal to 1 indicates that no ranking is defined.

RegionWisePackingBox represented by the syntax in Table 3 indicates that the projected frame is packed region-wise and needs to be unpacked before rendering.

TABLE 3

```
aligned(8) class RegionWisePackingBox extends Box('rwpk') {
    RegionWisePackingStruct( );
}
aligned(8) class RegionWisePackingStruct {
    unsigned int(8) num_regions;
    unsigned int(32) proj_frame_width;
    unsigned int(32) proj_frame_height;
    bit(7) reserved = 0;
    unsigned int(1) fov_flag;
    for (i = 0; i < num_regions; i+ + ) {
        if(fov_flag == 1){
            unsigned int(16) center_pitch[i];
            unsigned int(16) center_yaw[i];
            unsigned int(16) hor_range[i];
            unsigned int(16) ver_range[i];
        }
        quality_ranking [i];
        bit(4) reserved = 0;
        unsigned int(4) packing_type[i];
    }
    for (i = 0; i < num_regions; i+ + ) {
        if (packing_type[i] == 0)
            RectRegionPacking(i);
        else if (packing_type[i] == 1)
            SphereRegionPacking(i);
    }
}
```

The semantics of parameters of the above syntax are described as follows.

num_regions—specifies the number of packed regions. A value of 0 is reserved.

proj_frame_width and proj_frame_height—respectively specify the width and height of the projected frame.

packing_type—specifies the type of region-wise packing. packing_type equal to 0 indicates rectangular region-wise packing. packing_type equal to 1 indicates sphere surface region-wise packing.

quality_ranking[i]—specifies the quality ranking (i.e., quality level) of the region relative to that of other regions in 360 content (i.e., the entire projected frame). The quality ranking indicates priority in transmission and rendering. A lower value represents higher-quality content. The quality ranking[i] has a value ranging from 1 to 100. quality_ranking equal to 0 indicates that no ranking is defined.

fov_flag, center_pitch[i], center_yaw[i], hor_range[i], ver_range[i]—are the same as described above in RectRegionPacking.

SphereRegionPacking—indicates a relationship between a region of a spherical 3D image and a region of a packed 2D image when sphere surface region-wise packing is used. SphereRegionPacking may be described by the syntax in Table 4.

TABLE 4

```
aligned(8) class SphereRegionPacking(i) {
    unsigned int(16) center_pitch[i];
    unsigned int(16) center_yaw[i];
    unsigned int(16) hor_range[i];
    unsigned int(16) ver_range[i];
    unsigned int(8)  transform_type[i];
    unsigned int(32) packed_reg_width[i];
    unsigned int(32) packed_reg_height[i];
    unsigned int(32) packed_reg_top[i];
    unsigned int(32) packed_reg_left[i];
}
```

The semantics of parameters of SphereRegionPacking are described as follows.

center_pitch[i] and center_yaw[i]—specify the center point of a spherical region represented by the ith region in 0.01 degrees on a coordinate system specified by a Projection Orientation Box (indicating the orientation of a 3D image). center_yaw ranges from −18000 to 17999, and center_pitch ranges from −9000 to 9000.

hor_range and ver_range—respectively indicate horizontal and vertical ranges of an ith region in 0.01 degrees. hor_range and ver_range specify a range to pass through the center point of the ith region. hor_range ranges from 1 to 36000, and ver_range ranges from 1 to 18000. center_pitch+ver_range/2 is not allowed to exceed 9000. center_pitch−ver_range/2 is not allowed to be less than −9000.

transform_type[i], packed_reg_width[i], packed_reg_height[i], packed_reg_top[i], and packed_reg_left[i]—are the same as described above in RectRegionPacking.

When a projection format is equirectangular projection, the spherical region represented by the ith rectangular region is specified by two yaw circles and two pitch circles.

In some embodiments, when SphereRegionPacking is used instead of RectRegionPacking, the transmitter may generate a packed 2D image directly from a 3D image. A receiver may generate a 3D image directly from a packed 2D image.

The following values are input regarding transformation of sample positions for rectangular region-wise packing.
  Sample position (x, y) in the packed region, expressed as sample units
  Width and height of a region in the projected frame, expressed as sample units (projRegWidth, projRegHeight)
  Width and height of a region in the packed frame, expressed as sample units (packedRegWidth, packedRegHeight)
  Transformation type (transformType)
The following values are output regarding transformation of sample positions for rectangular region-wise packing.
  Sample position (i, j) in the projected region, expressed as sample units
The following syntax may be used for transformation of sample positions for rectangular region-wise packing.

TABLE 5

```
if(transformType==0||transformType==1||transformType==2||transformType==3) {
    horRatio = projRegWidth÷packedRegWidth
    verRatio = projRegHeight÷packedRegHeight
}
else if (transformType == 4|| transformType == 5|| transformType == 6|| transformType == 7) {
    horRatio = projRegWidth÷packedRegHeight
    verRatio = projRegHeight÷packedRegWidth
}
```

TABLE 5-continued

```
if (transformType == 0) {
    i = horRatio*( x+ 0.5)−0.5
    j = verRatio*( y+ 0.5)−0.5
}
if (transformType == 1) {
    i = horRatio*( packedRegWidth−x−0.5)−0.5
    j = verRatio*( y+ 0.5)−0.5
}
else if (transformType == 2) {
    i = horRatio*( packedRegWidth−x−0.5)−0.5
    j = verRatio*( packedRegHeight−y−0.5)−0.5
}
else if (transformType == 3) {
    = horRatio*(x+ 0.5)−0.5
    j = verRatio*( packedRegHeight−y−0.5)−0.5
}
else if (transformType == 4) {
    i = horRatio *( y+ 0.5)−0.5
    j = verRatio *( x+ 0.5)−0.5
}
else if (transformType == 5) {
    i = horRatio*( y+ 0.5)−0.5
    j = verRatio*( packedRegWidth−x−0.5)−0.5
}
else if (transformType == 6) {
    i = horRatio *( packedRegHeight−y−0.5)−0.5
    j = verRatio *( packedRegWidth−x−0.5)−0.5
}
else if (transformType == 7) {
    i = horRatio *( packedRegHeight−y−0.5)−0.5
    j = verRatio *( x+ 0.5)−0.5
}
```

With respect to each luma sample position (xPackedFrame, yPackedFrame) belonging to an nth region having packing_type[n] equal to 0 (i.e., to which rectangular region-wise packing is applied) within the packed frame, a sample position (xProjFrame, yProjFrame) corresponding to the projected frame may be derived as follows.

x is set to be equal to xPackedFrame−packed_reg_left[n].

y is set to be equal to yPackedFrame−packed_reg_top[n].

The above syntax for transformation of sample positions for rectangular region-wise packing is applied with x, y, packed_reg_width[n], packed_reg_height[n], proj_reg_width[n], proj_reg_height[n], and transform_type[n] as inputs. An output is allocated to a sample position (i, j).

xProjFrame is set to be equal to proj_reg_left[n]+i.

When xProjFrame is equal to or greater than proj_frame_width, xProjFrame is set to be equal to xProjFrame−proj_frame_width.

yProjFrame is set to be equal to proj_reg_top[n]+j.

When a chroma format and a chroma location type LocType are used, CenterLeftOffsetC, CenterTopOffsetC, horRatioC, and verRatioC values may be specified below in Table 6.

TABLE 6

| Chroma format | LocType | CenterLeftOffsetC | CenterTopOffsetC | horRatioC | verRatioC |
|---|---|---|---|---|---|
| 4:2:0 | 0 | 0.125 | 0.25 | 2 | 2 |
| 4:2:0 | 1 | 0.25 | 0.25 | 2 | 2 |
| 4:2:0 | 2 | 0.125 | 0.125 | 2 | 2 |
| 4:2:0 | 3 | 0.25 | 0.125 | 2 | 2 |
| 4:2:0 | 4 | 0.125 | 0.375 | 2 | 2 |
| 4:2:0 | 5 | 0.25 | 0.375 | 2 | 2 |
| 4:2:2 | — | 0.125 | 0.5 | 2 | 1 |
| 4:4:4 | — | 0.5 | 0.5 | 1 | 1 |

With respect to each chroma sample position (xPackedFrameC, yPackedFrameC) belonging to the nth region having packing_type[n] equal to 0 (i.e., to which rectangular region-wise packing is applied) within the packed frame, a sample position (xProjFrameC, yProjFrameC) corresponding to the projected frame may be derived as follows.

xC is set to be equal to xPackedFrameC—packed_reg_left[n]/horRatioC.

yC is set to be equal to yPackedFrameC—packed_reg_top[n]/verRatioC.

packedRegWidthC is set to be equal to packed_reg_width[n]/horRatioC.

packedRegHeightC is set to be equal to packed_reg_height[n]/verRatioC.

projRegWidthC is set to be equal to proj_reg_width[n]/horRatioC.

projRegHeightC is set to be equal to proj_reg_height[n]/verRatioC.

The above syntax for transformation of sample positions for rectangular region-wise packing is applied with xC, yC, packedRegWidthC, packedRegHeightC, projRegWidthC, projRegHeightC, and transform_type[n] as inputs. An output is allocated to a sample position (i, j).

xProjFrameC is set to be equal to proj_reg_left[n]/horRatioC+i.

When xProjFrameC is equal to or greater than proj_frame_width/horRatioC, xProjFrameC is set to be equal to xProjFrameC−(proj_frame_width/horRatioC).

yProjFrameC is set to be equal to proj_reg_top[n]/verRatioC+j.

Referring back to FIG. 1, the transmitter may encode the packed 2D image (240). The packed 2D image may be divided into a plurality of regions. Encoding may be performed separately on the plurality of regions of the packed 2D image. In some embodiments, encoding may be performed on only one or more regions to be transmitted among the plurality of regions of the packed 2D image. In some embodiments, encoding may be performed on a group image of two or more regions among the plurality of regions of the packed 2D image. In some embodiments, encoding may be performed on the entire packed 2D image. Encoding may be performed using a conventionally known encoding method for a 2D image.

The transmitter may encapsulate encoded data (150). Encapsulation may refer to a process of partitioning encoded data and processing the encoded data to comply with a given transport protocol via processing, such as adding a header to partitioned data. The transmitter may transmit the encapsulated data. The transmitter may transmit additional data associated with the encapsulated data and data necessary to play the data (e.g., metadata) along with the data or separately from the data.

Data transmission by the transmitter may be performed in accordance with MPEG Media Transport (MMT) or Dynamic Adaptive Streaming over HTTP (DASH) but is not limited thereto.

Although not shown, the transmitter may also transmit audio data to the receiver in addition to data of an image.

According to some embodiments, the transmitter may generate a plurality of tracks corresponding to a 3D image and may transmit data of some or all of the plurality of tracks to the receiver. The plurality of tracks may have data of different regions or may have different quality levels.

Figure 3:
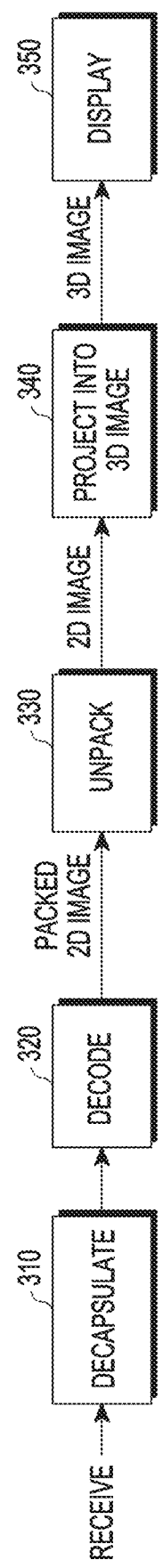
FIG. 3 illustrates a system of a receiver for receiving data of a 3D image according to an embodiment of the disclosure.

Hereinafter, a receiver will be described with reference to FIG. 3. FIG. 3 illustrates a system of a receiver for receiving data of a 3D image according to an embodiment of the disclosure. The receiver may be a VR device or an AR device. Further, the receiver may refer to any type of device that is capable of receiving and playing data of a 3D image.

The receiver may receive data of a 3D image transmitted from a transmitter. The receiver may decapsulate the received data (310). Encoded data generated by encoding 140 in FIG. 1 may be obtained via decapsulation 310.

The receiver may decode the decapsulated (310) data (320). A packed 2D image may be reconstructed via decoding 320.

The receiver may unpack the decoded data (i.e., the packed 2D image) (330). A 2D image generated by projection 120 in FIG. 1 may be reconstructed via unpacking. Unpacking may refer to inverse transformation of a plurality of regions of a projected 2D image which is modified and/or rearranged in packing (130) in FIG. 1. To this end, the receiver needs to know a method for packing (130). The method for packing (130) may be predetermined between the receiver and the transmitter. According to some embodiments, the transmitter may transmit information about the method for packing (130) to the receiver through a separate message, such as metadata. According to some embodiments, transmission data generated by encapsulation (150) may include the information about the method for packing (130), for example, in a header.

The receiver may project the unpacked 2D image into a 3D image (340). The receiver may use inverse projection of the projection used for projection (120) into a 2D image in FIG. 1 in order to project a 2D image into a 3D image, without being necessarily limited thereto. The receiver may project the unpacked 2D image into the 3D image, thereby generating a 3D image.

The receiver may display at least part of the 3D image through a display device (350). For example, the receiver may extract and render only data corresponding to a current field of view (FOV) from the 3D image.

Figure 4:
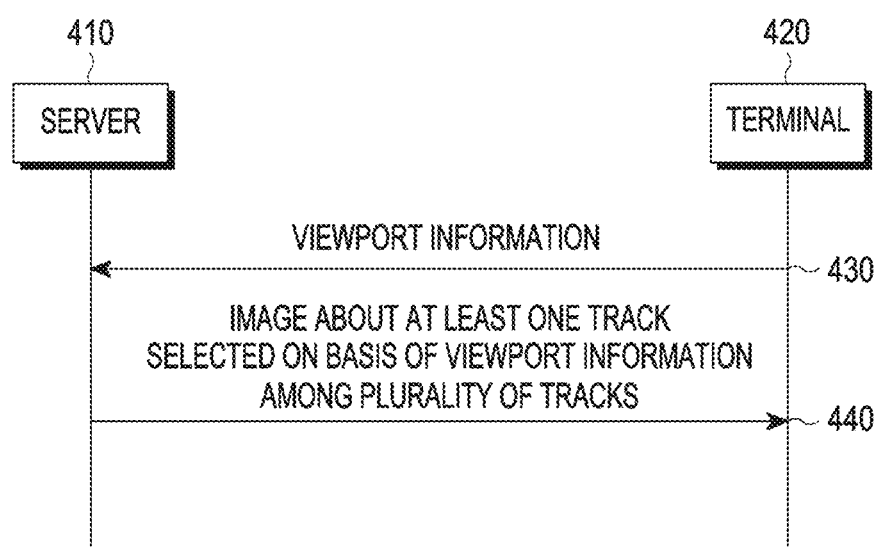
FIG. 4 is a flowchart illustrating the operation of a server and a terminal according to an embodiment of the disclosure.

FIG. 4 is a flowchart illustrating the operation of a server and a terminal according to an embodiment of the disclosure. In FIG. 4, the server 410 may correspond to the transmitter of FIG. 1, and the terminal 420 may correspond to the receiver of FIG. 3.

In operation 430, the terminal 420 may transmit viewport information about the terminal to the server 410. The viewport information about the terminal may be information specifying a region (i.e., a viewport) to be displayed by the terminal. In some embodiments, the viewport information may be information specifying a region in a 3D image corresponding to a viewport. In some embodiments, the viewport information may be information specifying a region corresponding to a viewport in a 2D image projected from a 3D image.

In operation 440, the server 410 may transmit, to the terminal 420, data of at least one track selected from among a plurality of tracks on the basis of the viewport information. The server 410 may generate and have a plurality of tracks associated with a single 3D image. In some embodiments, the plurality of tracks may include data of different regions of the 3D image. In some embodiments, the plurality of tracks may include information about the same region in the 3D image (e.g., the entire 3D image), and the plurality of tracks may respectively have different qualities. In some embodiments, the plurality of tracks may be generated from the single 3D image. In some embodiments, each of the plurality of tracks may be generated from an image captured from each of a plurality of cameras to form a single 3D image. Hereinafter, operation 440 will be described in detail with reference to FIG. 5 to FIG. 8.

Figure 5:
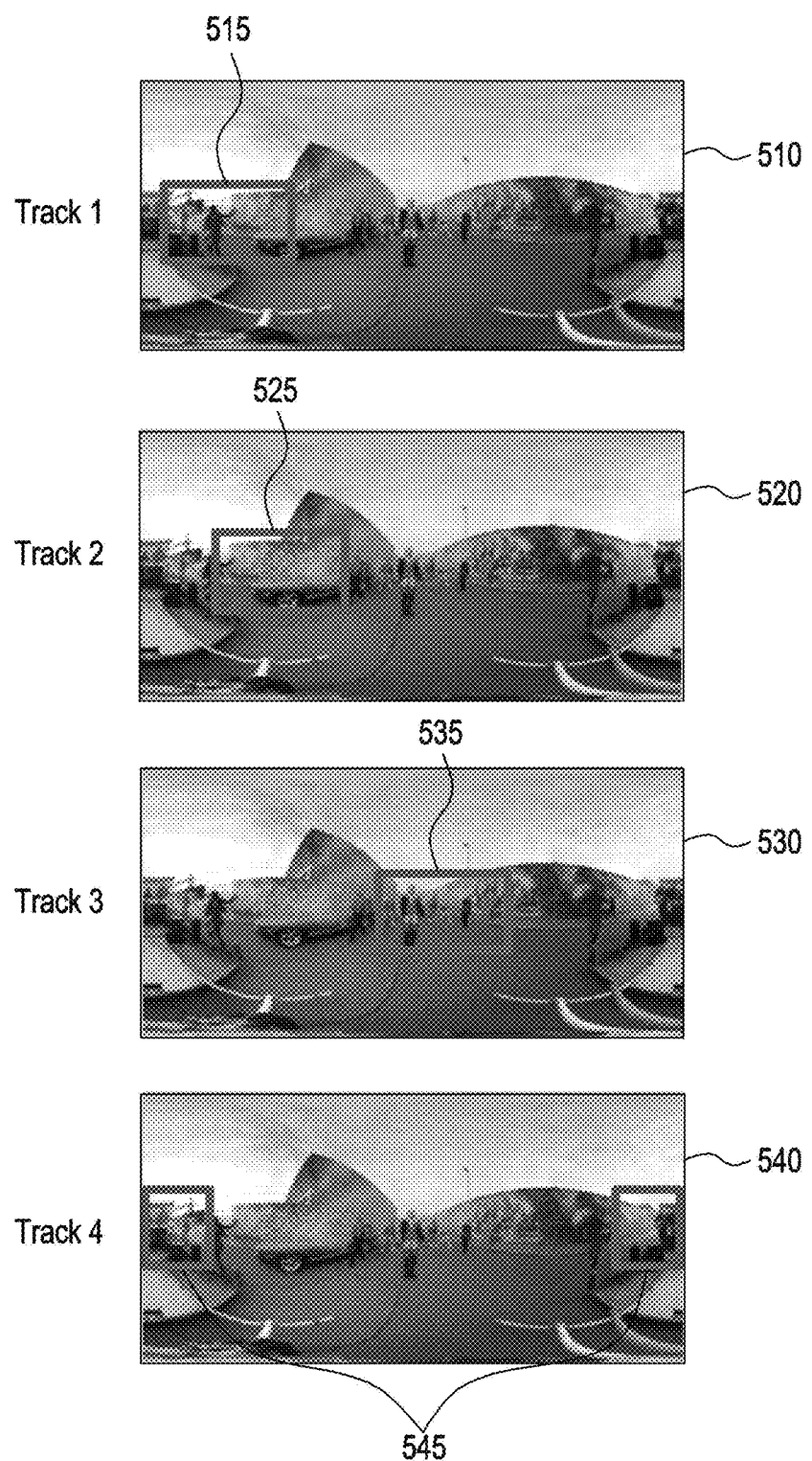
FIG. 5 illustrates a plurality of tracks according to an embodiment of the disclosure.

FIG. 5 illustrates a plurality of tracks according to an embodiment of the disclosure. The plurality of tracks 510, 520, 530, and 540 may have different qualities. Specifically, a particular region of each of the plurality of tracks 510, 520, 530, and 540 may have a different quality level from a remaining region. The position of the particular region having the different quality level from the remaining region may vary in each of the plurality of tracks 510, 520, 530, and 540. In the embodiment of FIG. 5, a first region 515 in a first track 510, a second region 525 in a second track 520, a third region 535 in a third track 530, and a fourth region 545 in a fourth track 540 are particular regions having a different quality level from the remaining region in each track. The quality level of each of the first to fourth regions 515, 525, 535, and 545 may be higher than that of the remaining region in each track. The first to fourth regions 515, 525, 535, and 545 may have the same quality level but are not limited thereto.

In the embodiment of FIG. 5, when the server 410 has the first to fourth tracks 510, 520, 530, and 540, the server 410 may select at least one track to transmit on the basis of the received viewport information. Specifically, the server 410 may select at least one track including a region having a high quality level associated with a region indicated by the viewport information received from the terminal 420. For example, when the region indicated by the viewport information is the same as the first region 515 or is included in the first region 515, the server 410 may select the first track 510; when the region indicated by the viewport information is included in the second region 525, the server 410 may select the second track 520. In another example, the server 410 may select, as a track to transmit, a track including a region that most overlaps with the region indicated by the viewport information among the first to fourth regions 515, 525, 535, and 545. In some embodiments, the server 410 may select a plurality of tracks to transmit. For example, when the region indicated by the viewport information is included in both the first region 515 and the second region 525, the server may select the first track 510 and the second track 520. In another example, when the region indicated by the viewport information is included in the second region 525, the server 410 may select, as tracks to transmit, not only the second track 520 but also the first track 510 and the third track 530 respectively including the first region 515 and the third region 535, which are adjacent to the second region 525, as high-quality regions.

The first to fourth tracks 510, 520, 530, and 540 illustrated in the embodiment of FIG. 5 are projected 2D images, and the first to fourth regions 510, 520, 530, and 540 may be displayed in the projected 2D images, respectively. When at least one region having a different quality level is present in a 2D image, the syntax illustrated in Table 7 may be used to indicate quality levels of regions in the 2D image.

TABLE 7

```
aligned(8) class 2DRegionQualityRankingBox extends FullBox ('2dqr, 0,
0) {
    unsigned int (8) num_regions;
    for (i = 0; i < num_regions; i++ ) {
        unsigned int (8) quality_ranking;
        unsigned int (2) view_idc;
        if (i == num_regions − 1)
            unsigned int (1) remaining_area_flag;
        else
            bit (1) reserved_bit = 0;
        bit (5) reserved = 0;
        if (remaining_area_flag == 0) {
            unsigned int (16) left_offset;
            unsigned int (16) top_offset;
            unsigned int (16) region_width;
            unsigned int (16) region_height;
        }
    }
}
```

The semantics of parameters of the above syntax are described as follows.

num_regions—specifies the number of regions about which quality ranking (i.e., quality level) information is provided.

quality_ranking—specifies the quality ranking of a region. quality_ranking equal to 0 indicates that quality_ranking is not defined. When region A has a lower quality_ranking value than region B and the quality_ranking value is not 0, region A has a higher quality than region B. When region A partially or entirely overlaps region B, quality_ranking of region A needs to be the same as quality_ranking of region B.

view_idc–view_idc equal to 0 indicates that content is monoscopic. view_idc equal to 1 indicates that a region is positioned in a left view of stereoscopic content. view_idc equal to 2 indicates that the region is positioned in a right view of the stereoscopic content. view_idc equal to 2 indicates that the region is positioned in both the left view and the right view.

remaining_area_flag–remaining_area_flag equal to 0 specifies that a region is defined by left_offset, top_offset, region_width, and region_height. remaining_area_flag equal to 1 specifies that the region is not covered by any other region defined in the box.

left_offset, top_offset, region_width, and region_height—are integer values for representing the size and position of a region. left_offset and top_offset respectively indicate horizontal and vertical coordinates in luma samples at a top left corner of a region in a packed frame. region_width and region_height respectively indicate the width and height of the region in the luma samples in the packed frame. left_offset+region_width needs to be less than the width of VisualSampleEntry (i.e., the width of the frame). top_offset+region_height needs to be less than the height of VisualSampleEntry (i.e., the height of the frame).

Regions in an image (frame or track) represented by this syntax and information about the quality level of each of the regions may be used for the server 410 to identify the regions in the image and the quality level of each of the regions or may be transmitted from the server 410 to the terminal 420 as metadata.

Figure 9:
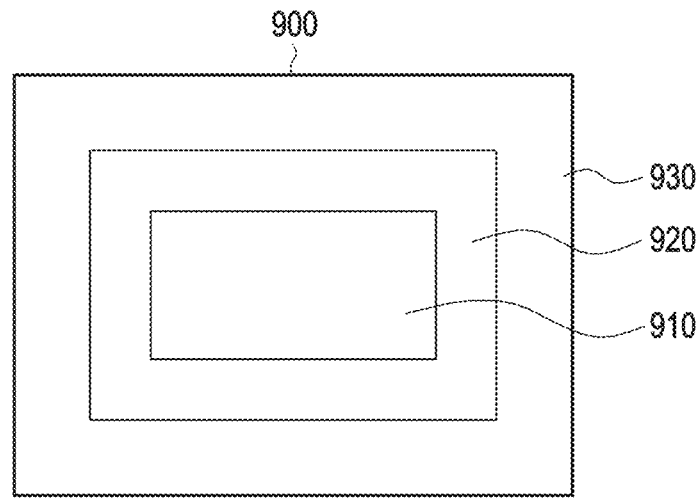
FIG. 9 illustrates a 2D image including regions having different qualities according to an embodiment of the disclosure.

In some embodiments, one image (track or frame) may include regions having different quality levels. For example, referring to FIG. 9 illustrating a 2D image including regions having a quality level individually set, the 2D image 900 may include a first region 910, a second region 920 enclosing the first region 910, a third region 930 excluding the first region 910 and the second region 920. A quality level may be individually set for the first region 910, the second region 920, and the third region 930. In this case, the above syntax for indicating quality levels of regions in a 2D image may also be used to indicate quality information about the regions of the 2D image 900. The third region 930 may be a remaining region having an attribute of remaining_area_flag equal to 1.

Figure 6:
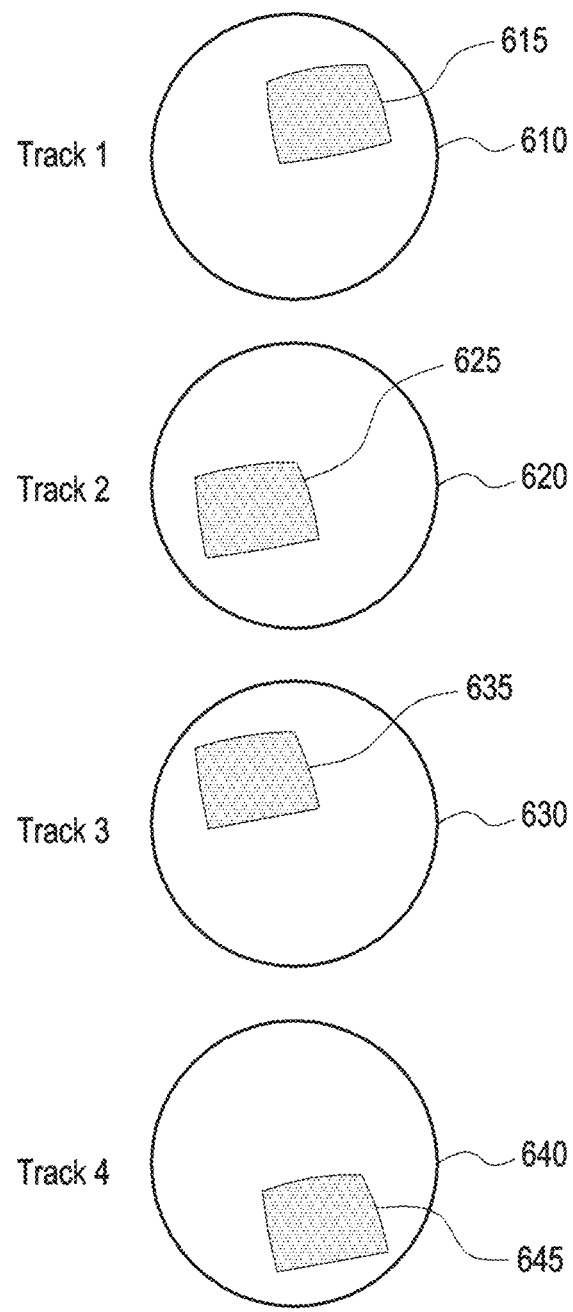
FIG. 6 illustrates a plurality of tracks according to another embodiment of the disclosure.

FIG. 6 illustrates a plurality of tracks according to another embodiment of the disclosure. As in FIG. 5, first to fourth tracks 610, 620, 630, and 640 in FIG. 6 may include a particular region having a different quality level from a remaining region of each track. Each of first to fourth regions 615, 625, 635, and 645 may be a particular region having a different quality level from the remaining region in each track. In the embodiment of FIG. 6, a method for selecting at least one track to transmit is substantially the same as that described in FIG. 5.

In the embodiment of FIG. 6, the first to fourth regions 615, 625, 635, and 645 may be displayed in a 3D image rather than in a projected 2D image. Illustrative syntax for indicating quality levels of regions of the 3D image is shown in Table 8.

TABLE 8

```
aligned (8) class SphereRegionQualityRankingBox entends FullBox
('srqr', 0, 0) {
    unsigned int (8) region_definition_type;
    unsigned int (8) num_regions;
    for (i=0; i < num_regions; i+ + ) {
        unsigned int (8) quality_ranking;
        unsigned int (2) view_idc;
        if (i == num_regions -1)
            unsigned int (1) remaining_area_flag;
        else
            bit (1) reserved_bit = 0;
        if (remaining_area_flag == 0)
            RegionOnSphereStruct (1);
    }
}
```

The semantics of parameters of the above syntax are described as follows.

region_definition_type—region_definition_type equal to 0 indicates that a region is specified by four great circles in a spherical 3D image. region_definition_type equal to 1 indicates that the region is specified by two yaw circles and two pitch circles.

num_regions—specifies the number of regions about which quality ranking (i.e., quality level) information is provided.

quality_ranking—specifies the quality ranking of a region. quality_ranking equal to 0 indicates that quality_ranking is not defined. When region A has a lower quality_ranking value than region B and the quality_ranking value is not 0, region A has a higher quality than region B. When region A partially or entirely overlaps region B, quality_ranking of region A needs to be the same as quality_ranking of region B.

view_idc—view_idc equal to 0 indicates that content is monoscopic. view_idc equal to 1 indicates that a region is positioned in a left view of stereoscopic content. view_idc equal to 2 indicates that the region is positioned in a right view of the stereoscopic content. view_idc equal to 2 indicates that the region is positioned in both the left view and the right view.

remaining_area_flag—remaining_area_flag equal to 0 specifies that a region is defined by RegionOnSphereSturct (1). remaining_area_flag equal to 1 specifies that the region is not covered by any other region defined in the box.

RegionOnSphereStruct (1)—indicates the position and size of a region on a sphere in relation to a spherical coordinate system. The type of regions is defined by region_definition_type. center_yaw, center_pitch, hor_range, and ver_range are used to specify the region on the sphere.

The syntax of RegionOnSphereStruct is illustrated in Table 9.

TABLE 9

```
aligned(8) RegionOnSphereStruct(range_included_flag) {
    signed int(16) center_yaw;
    signed int(16) center_pitch;
    if (range_included_flag) {
        unsigned int(16) hor_range;
        unsigned int(16) ver_range;
        unsigned int(16) tile_entry_count;
            for (j = 0; j < tile_entry_count; j+ + )
                unsigned int(16) tile_region_groupID;
    }
}
```

The semantics of parameters of RegionOnSphereStruct are described as follows.

center_yaw and center_pitch—specify the center point of a region specified by this sample in 0.01 degrees on a global coordinate system. center_yaw ranges from −18000 to 17999, and center_pitch ranges from −9000 to 9000.

hor_range and ver_range—respectively indicate horizontal and vertical ranges of the region specified by this sample in 0.01 degrees. hor_range and ver_range specify a range to pass through the center point of an ith region. hor_range ranges from 1 to 36000, and ver_range ranges from 1 to 18000. center_pitch+ver_range/2 is not allowed to exceed 9000. center_pitch−ver_range/2 is not allowed to be less than −9000.

tile_entry_count—specifies the number of tile groups corresponding to the region specified by this sample.

tile_region_groupID—identifies a tile region in the region specified by this sample, which covers the entirety or part of a region defined by center_yaw, center_pitch, hor_range, and ver_range.

Explaining region_definition_type in detail, region_definition_type equal to 0 indicates that a region is specified by four great circles in a 3D image. Here, a great circle refers to a circle having the largest diameter that can be defined on the surface of a sphere. In this case, the region may be specified by the coordinates of the center of the region, a roll value, the horizontal angle range of a region relative to the center of the sphere, and the vertical angle range of the region.

region_definition_type equal to 1 indicates that the region is specified by two yaw circles and two pitch circles. A yaw circle refers to a circle passing through the z-axis of a sphere in the x-y-z coordinate system with the center of the sphere as the origin, and a pitch circle refers to a circle parallel with the xy plane of the sphere. In this case, the region may be specified by the coordinates of the center of the region, the horizontal angle range of a region relative to the center of the sphere, and the vertical angle range of the region.

As in FIG. 9, when a 3D image includes a plurality of regions having quality information individually set, illustrative syntax for indicating quality levels of regions of the 3D image may also be used.

Figure 7:
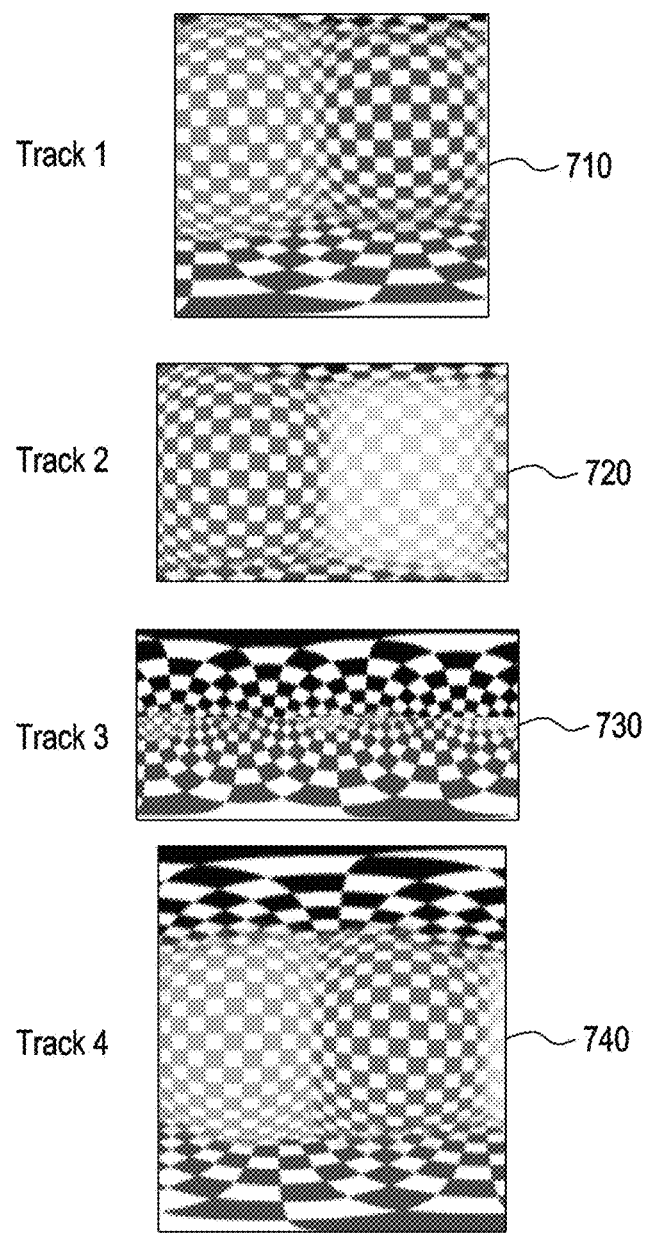
FIG. 7 illustrates a plurality of tracks according to still another embodiment of the disclosure.
Figure 8:
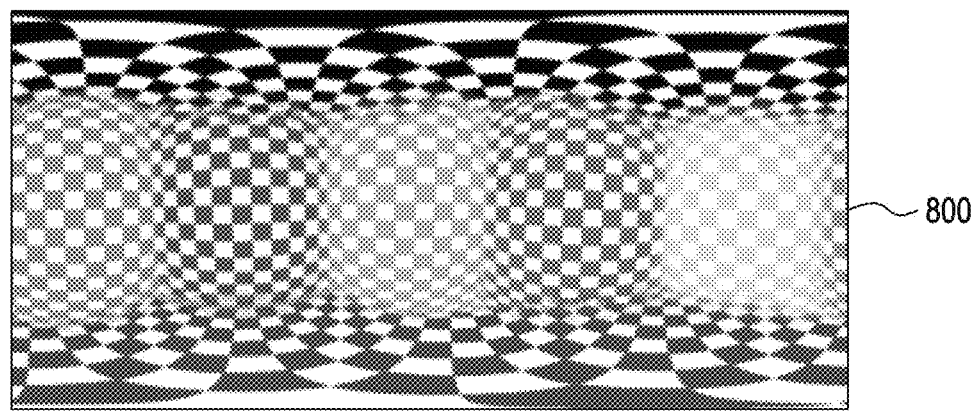
FIG. 8 illustrates a 2D image represented by the plurality of tracks of FIG. 7.

FIG. 7 illustrates a plurality of tracks according to still another embodiment of the disclosure. FIG. 8 illustrates a 2D image represented by the plurality of tracks of FIG. 7. In the embodiment of FIG. 7, first to fourth tracks 710, 720, 730, and 740 may include data of different regions of the entire 2D or 3D image, respectively. The projected 2D image 800 of FIG. 8 shows an entire image expressed by the first to fourth tracks 710, 720, 730, and 740. The first to fourth tracks 710, 720, 730, and 740 may have different quality levels. The server 410 may select a track including a region corresponding to a viewport from among the first to fourth tracks 710, 720, 730, and 740 in order to select a track to transmit on the basis of viewport information received from the terminal 420. According to some embodiments, the first to fourth tracks 710, 720, 730, and 740 may overlap each other. For example, when the region corresponding to the viewport exists in all of a plurality of tracks, the server 410 may select, as a track to transmit, a track having the highest quality from among the plurality of tracks.

CoverageInformationBox may be employed to use information about a region on the surface of a sphere represented by a projected frame associated with a ProjectedOmnidirectionalVideoBox (indicating whether samples included in a track correspond to a projected frame or a packed frame) container. The absence of CoverageInformationBox indicates that the projected frame is a representation of a full sphere. For example, in the embodiment of FIG. 7 and FIG. 8, CoverageInformationBox may be present. Fields in this box are applied after ProjectionOrientationBox is applied in the presence of ProjectionOrientationBox. The syntax of CoverageInformationBox is illustrated in Table 10.

TABLE 10 aligned(8) class CoverageInformationBox extends FullBox('covi', version = 0, flags) {
   RegionOnSphereStruct(1);
   unsigned int(8)  coverage_quality;
}

The semantics of parameters of CoverageInformationBox are described as follows.

RegionOnSphereStruct(1)—is the same as described above in SphereRegionQualityRankingBox.

coverage_quality—specifies the quality of a coverage region associated with a ProjectedOmnidirectionalVideoBox container relative to that of other coverage regions in different tracks that can be merged to form 360 content (i.e., the entire projected frame). coverage_quality indicates priority in delivery and rendering, and a higher quality has a higher priority. A lower value represents higher-quality content. coverage_quality has a value ranging from 1 to 100. coverage_quality equal to 0 indicates that no ranking (i.e., no quality level) is defined.

Figure 10:
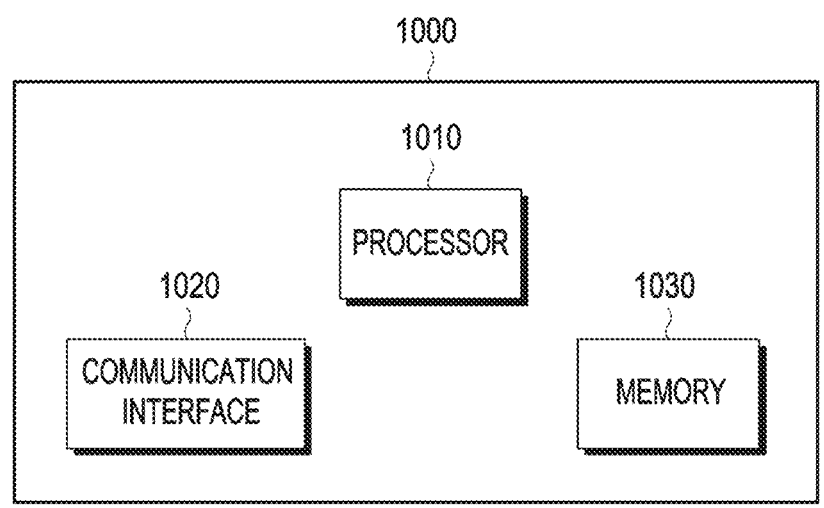
FIG. 10 is a block diagram illustrating a transmitter according to an embodiment of the disclosure.

Hereinafter, the structure of a transmitter will be described with reference to FIG. 10. FIG. 10 is a block diagram illustrating a transmitter according to an embodiment of the disclosure.

The transmitter 1000 may include a memory 1030, a communication interface 1020, and a processor 1010. The transmitter 1000 may be configured to perform the operations of the transmitter (i.e., the server) described above in the embodiments. The processor 1010 may be electrically connected to the memory 1030 and the communication interface 1020 to enable communication therewith. The transmitter 1000 may transmit and receive data including image data and metadata through the communication interface 1020. The memory 1030 may store pieces of information for the operation of the transmitter 1000. Commands or codes to control the processor 1010 may be stored in the memory 1030. In addition, pieces of temporary or persistent data required for the operation of the processor 1010 may be stored in the memory 1030. The processor 1010 may refer to one processor and, according to some embodiments, may refer to a set of a plurality of processors functionally divided. The processor 1010 may be configured to control the operation of the transmitter 1000. The operations of the transmitter 1000 described above may be processed and executed substantially by the processor 1010. Although an operation of transmitting and receiving data is performed via the communication interface 1020 and an operation of storing data and commands is performed by the memory 1030, the operations of the communication interface 1020 and the memory 1030 may be controlled by the processor 1010, and thus the operation of transmitting and receiving data and the operation of storing commands may also be considered to be performed by the processor 1010.

Similarly to the transmitter 1000, a receiver (e.g., a terminal or a VR device) may also include a memory, a communication interface, and a processor. A description of the memory, the communication interface, and the processor of the receiver is similar to that of the elements of the transmitter 1000. The receiver may further include a display device to display a received omnidirectional image.

The syntaxes described herein are provided only for illustrative purposes. All parameters included in a particular syntax are not necessarily required to construct data (i.e., metadata) formed by the syntax. Those having ordinary skill in the art will readily appreciate that data may be constructed using only some of the described parameters. Data constructed via the illustrated syntaxes may be used within a server, and may also be transmitted to a terminal and may be used by the terminal to process data of an omnidirectional image.

While the embodiment of the disclosure has been described with reference to the accompanying drawings, it will be understood by those skilled in the art that the disclosure may be varied and modified without departing from the technical spirit and the essential feature of the disclosure. Accordingly, it should be understood that the embodiments described above are merely exemplary and are not limited.

The invention claimed is:

1. A method for transmitting, by a transmission device, data related to an omnidirectional image, the method comprising:
   identifying data of a 2 dimensional (2D) image which is generated based on projecting an omnidirectional image to a planar space;
   identifying metadata related to the omnidirectional image; and
   transmitting the data of the 2D image and the metadata, wherein the metadata comprises information on quality ranking of each of one or more regions of the omnidirectional image or information on quality ranking of one or more regions of the 2D image.

2. The method of claim 1, wherein the information on quality ranking of each of the one or more regions of the omnidirectional image comprises:
   information indicating whether each of the one or more regions of the omnidirectional image is defined by four great circles or by two yaw circles and two pitch circles;
   information indicating a number of the one or more regions of the omnidirectional image for which quality ranking information is given;
   information indicating the quality ranking of each of the one or more regions of the omnidirectional image;
   information indicating whether a region of the one or more of regions of the omnidirectional image is monoscopic, or is on a left view of stereoscopic content, or on a right view of the stereoscopic content, or is on both the left view and the right view; and
   information indicating location and size of each of the one or more of regions of the omnidirectional image.

3. The method of claim 1, wherein the information on quality ranking of one or more regions of the 2D image comprises:
   information indicating a number of the one or more regions of the 2D image for which quality ranking information is given;
   information indicating the quality ranking of each of the one or more regions of the 2D image;
   information indicating whether a region of the one or more of regions of the 2D image is monoscopic, or is on a left view of stereoscopic content, or on a right view of the stereoscopic content, or is on both the left view and the right view; and
   information indicating location and size of each of the one or more of regions of the 2D image.

4. The method of claim 1, wherein, if the 2D image is generated by region-wise packing a plurality of regions of a projected 2D image which is projected from the omnidirectional image, the metadata comprises information indicating each of the plurality of regions on the projected 2D image and information indicating a packed region on the 2D image corresponding to each of the plurality of regions on the projected 2D image.

5. The method of claim 4, wherein the information indicating each of the plurality of regions on the projected 2D image comprise width, height top offset, and left offset of each of the plurality of regions on the projected 2D image.

6. The method of claim 4, wherein information indicating the packed region on the 2D image corresponding to each of the plurality of regions on the projected 2D image comprises height top offset, and left offset of the packed region.

7. The method of claim 4, wherein, if the 2D image is generated by region-wise packing the plurality of regions of the projected 2D image, the metadata further comprises information indicating transform type for a first region among the plurality of regions on the projected 2D image, and the transform type is applied when transforming the first region to a first packed region on the 2D image.

8. The method of claim 7, wherein the transform type indicates one of no transform, mirroring horizontally, rotation by 180 degree (counter-clockwise), rotation by 180 degrees (counter-clockwise) and mirroring horizontally, rotation by 90 degrees (counter-clockwise) and mirroring horizontally, rotation by 90 degrees (counter-clockwise), rotation by 270 degrees (counter-clockwise) or mirroring horizontally, and rotation by 270 degrees (counter-clockwise).

9. The method of claim 1, wherein the metadata further comprises information on content coverage of a track, and the information on the content coverage of the track comprises information indicating a region of the omnidirectional image.

10. The method of claim 1, wherein information indicating the region of the omnidirectional image comprises:
    information indicating center of the region of the omnidirectional image;
    information indicating horizontal range of the region of the omnidirectional image; and
    information indicating vertical range of the region of the omnidirectional image.

11. A transmission device for transmitting data related to an omnidirectional image, the transmission device comprising:
    at least one processor configured to:
       identify data of a 2 dimensional (2D) image which is generated based on projecting an omnidirectional image to a planar space, and
       identify metadata related to the omnidirectional image; and
    a transceiver configured to transmit the data of the 2D image and the metadata,
    wherein the metadata comprises information on quality ranking of each of one or more regions of the omnidirectional image.

12. The transmission device of claim 11, wherein the information on quality ranking of each of the one or more regions of the omnidirectional image comprises:
    information indicating whether each of the one or more regions of the omnidirectional image is defined by four great circles or by two yaw circles and two pitch circles;
    information indicating a number of the one or more regions for which quality ranking information is given;
    information indicating the quality ranking of each of the one or more regions of the omnidirectional image;
    information indicating whether a region of the one or more regions of the omnidirectional image is monoscopic, or is on a left view of stereoscopic content, or on a right view of the stereoscopic content, or is on both the left view and the right view; and
    information indicating location and size of each of the one or more regions of the omnidirectional image.

13. The transmission device of claim 11, wherein the information on quality ranking of one or more regions of the 2D image comprises:
    information indicating a number of the one or more regions of the 2D image for which quality ranking information is given;
    information indicating the quality ranking of each of the one or more regions of the 2D image;
    information indicating whether a region of the one or more of regions of the 2D image is monoscopic, or is on a left view of stereoscopic content, or on a right view of the stereoscopic content, or is on both the left view and the right view; and
    information indicating location and size of each of the one or more of regions of the 2D image.

14. The transmission device of claim 11, wherein, if the 2D image is generated by region-wise packing a plurality of regions of a projected 2D image which is projected from the omnidirectional image, the metadata comprises information indicating each of the plurality of regions on the projected 2D image and information indicating a packed region on the 2D image corresponding to each of the plurality of regions on the projected 2D image.

15. The transmission device of claim 14, wherein the information indicating each of the plurality of regions on the projected 2D image comprise width, height top offset, and left offset of each of the plurality of regions on the projected 2D image.

16. The transmission device of claim 14, wherein information indicating the packed region on the 2D image corresponding to each of the plurality of regions on the projected 2D image comprises height top offset, and left offset of the packed region.

17. The transmission device of claim 14, wherein, if the 2D image is generated by region-wise packing the plurality of regions of the projected 2D image, the metadata further comprises information indicating transform type for a first region among the plurality of regions on the projected 2D image, and the transform type is applied when transforming the first region to a first packed region on the 2D image.

18. The transmission device of claim 17, wherein the transform type indicates one of no transform, mirroring horizontally, rotation by 180 degree (counter-clockwise), rotation by 180 degrees (counter-clockwise) and mirroring horizontally, rotation by 90 degrees (counter-clockwise) and mirroring horizontally, rotation by 90 degrees (counter-clockwise), rotation by 270 degrees (counter-clockwise) or mirroring horizontally, and rotation by 270 degrees (counter-clockwise).

19. The transmission device of claim 11, wherein the metadata further comprises information on content coverage of a track, and the information on the content coverage of the track comprises information indicating a region of the omnidirectional image.

20. The transmission device of claim 11, wherein information indicating the region of the omnidirectional image comprises:
   information indicating center of the region of the omnidirectional image;
   information indicating horizontal range of the region of the omnidirectional image; and
   information indicating vertical range of the region of the omnidirectional image.

* * * * *